United States Patent
Gordon et al.

(10) Patent No.: US 6,389,218 B2
(45) Date of Patent: May 14, 2002

(54) METHOD AND APPARATUS FOR SIMULTANEOUSLY PRODUCING COMPRESSED PLAY AND TRICK PLAY BITSTREAMS FROM A VIDEO FRAME SEQUENCE

(75) Inventors: Donald F. Gordon, Los Altos; Ted Ludvig, Redwood City, both of CA (US)

(73) Assignee: DIVA Systems Corporation, Redwood City, CA (US)

( * ) Notice: Subject to any disclaimer, the term of this patent is extended or adjusted under 35 U.S.C. 154(b) by 0 days.

(21) Appl. No.: 09/201,529

(22) Filed: Nov. 30, 1998

(51) Int. Cl.$^7$ .................................................. H04N 5/91
(52) U.S. Cl. ........................ 386/68; 386/111; 386/112
(58) Field of Search ........................... 386/6–8, 33, 68, 386/81, 92, 98, 109, 110, 111, 112, 124; 360/48; H04N 5/91, 5/917

(56) References Cited

U.S. PATENT DOCUMENTS

| | | | | |
|---|---|---|---|---|
| 5,481,297 A | * | 1/1996 | Cash et al. | 348/14.12 |
| 5,581,778 A | * | 12/1996 | Chin et al. | 712/16 |
| 5,655,052 A | * | 8/1997 | Nakai et al. | 386/106 |
| 5,671,377 A | * | 9/1997 | Bleidt et al. | 345/723 |
| 5,692,092 A | * | 11/1997 | Nogami et al. | 386/68 |
| 5,740,307 A | * | 4/1998 | Lane | 386/68 |
| 5,815,146 A | | 9/1998 | Youden et al. | 345/327 |
| 5,889,918 A | | 3/1999 | Sakazaki et al. | 386/68 |
| 5,946,446 A | * | 8/1999 | Yanagihara | 386/68 |
| 6,026,213 A | * | 2/2000 | Higurashi et al. | 386/68 |
| 6,097,877 A | * | 8/2000 | Katayama et al. | 386/68 |
| 6,253,375 B1 | * | 6/2001 | Gordon et al. | 725/88 |

FOREIGN PATENT DOCUMENTS

| | | | | |
|---|---|---|---|---|
| EP | 0 701 371 A1 | | 3/1996 | H04N/7/173 |
| WO | WO96/13123 | * | 5/1996 | H04N/5/76 |
| WO | 96/17306 | | 6/1996 | G06F/15/16 |

OTHER PUBLICATIONS

Buddhikot et al "Design of a Large Multimedia Storage Server" Computer Networks and ISDN Systems 27, pp. 503–507, 1994.

* cited by examiner

Primary Examiner—Vincent F. Boccio
(74) Attorney, Agent, or Firm—Moser, Patterson & Sheridan, LLP

(57) ABSTRACT

An "all-in-one" encoder that simultaneously produces an MPEG-2 compliant fast forward, fast reverse and play bitstreams from a sequence of video frames, e.g., 601-format video. The encoder subsamples the video sequence, extracting a plurality of frames from the video sequence and buffering the subsampled frames. Simultaneous with the subsampling and buffering, the source frames are encoded within a real-time encoder, e.g., an MPEG-2 encoder. The buffered frames are recalled from the buffer and coupled to a second real-time encoder. The second encoder forms both the fast forward and fast reverse bitstreams using a time multiplexing technique wherein a group of pictures (GOP) for the fast forward stream can be formed, followed by the compression of the same GOP having the frames organized in reverse order. As such, the compressed GOPs are represented by the fast forward and fast reverse bitstreams. The play, fast forward, and fast reverse bitstreams for each GOP are organized into a file and stored on the mass storage device (e.g., disk drive array) of the file server.

19 Claims, 3 Drawing Sheets

METHOD AND APPARATUS FOR SIMULTANEOUSLY PRODUCING COMPRESSED PLAY AND TRICK PLAY BITSTREAMS FROM A VIDEO FRAME SEQUENCE

BACKGROUND OF THE DISCLOSURE

1. Field of the Invention

The invention relates to video-on-demand systems and, more particularly, the invention relates to a method and apparatus for simultaneously generating compressed play and trick play bitstreams from a video frame sequence.

2. Description of the Background Art

In a video-on-demand system such as the OnSet™ system manufactured by DIVA Systems Corporation, a file server is used for streaming video information to users (subscribers) of the system. The OnSet™ system is described in U.S. Pat. No. 6,253,375, issued Jun. 26, 2001, and the file server is described in U.S. Pat. Nos. 5,671,377 and 5,581,778. The disclosures of this application and these patents are incorporated herein by reference. The OnSet™ system contains service provider equipment coupled through an information distribution network to subscriber equipment. This system provides subscribers VCR-like controls to enable a subscriber to select information content, for example, a movie, then play, fast forward, rewind, pause, or stop the selected movie. The subscriber enters control commands through the subscriber equipment and the service provider equipment executes the commands to fulfill the purpose of the command, e.g., play, fast forward, rewind, stop or pause the movie.

A file server forms a portion of the service provider equipment and stores, for a given movie, a standard play stream (i.e., an MPEG-2 compressed video bitstream), a fast forward stream and a fast reverse play (rewind) stream. The fast forward and fast reverse streams are also MPEG-2 compressed video, where the fast forward stream is a compressed signal containing only every Nth frame of the uncompressed play video and the fast reverse stream is a compressed signal containing every Nth frame of the uncompressed play video played backwards. To store the video information, each stream is divided into portions (e.g., N-byte segments of compressed data) and striped onto a disk array. The disk array stores all the information that the file server can directly access.

The process for generating the fast forward and fast reverse streams is time consuming and expensive. The process requires a frame by frame analysis of the video stream to enable the frames to be encoded in an MPEG-2 compliant form, yet provide a fast forward and fast reverse effect when decoded. As such, the video sequence is processed to extract every Rth frame (i.e., one of every R frames, where R is an integer greater than 1) to form a fast forward sequence and then the fast forward sequence is encoded (compressed). For a fast reverse stream, a sequence of frames in reverse order is created and encoded. Such encoding can cost $17 to $20 per minute of video. This encoding process can not be used for producing fast forward and fast reverse streams in real time such that a real time program can be encoded and stored for almost immediate use of VCR-like functions.

Therefore, there is a need in the art for an improved encoding system for a video-on-demand system to ensure real-time availability of fast forward and fast reverse functions.

SUMMARY OF THE INVENTION

The disadvantages associated with the prior art are overcome by the invention of an "all-in-one" encoder that simultaneously produces an MPEG-2 compliant fast forward, fast reverse and play bitstreams from a sequence of video frames, e.g., 601-format video. The encoder of the present invention subsamples the video sequence, extracting a plurality of frames from the video sequence and buffering the subsampled frames. Simultaneous with the subsampling and buffering, the source frames are encoded within a real-time encoder, e.g., an MPEG-2 encoder. The buffered frames are recalled from the buffer and coupled to a second real-time encoder. The second encoder forms both the fast forward and fast reverse bitstreams using a time multiplexing technique wherein a group of pictures (GOP) for the fast forward stream can be formed, followed by the compression of the same GOP having the frames organized in reverse order. As such, the compressed GOPs are represented by the fast forward and fast reverse bitstreams. The play, fast forward, and fast reverse bitstreams for each GOP are organize into a file and stored on the mass storage device (e.g., disk drive array) of the file server.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
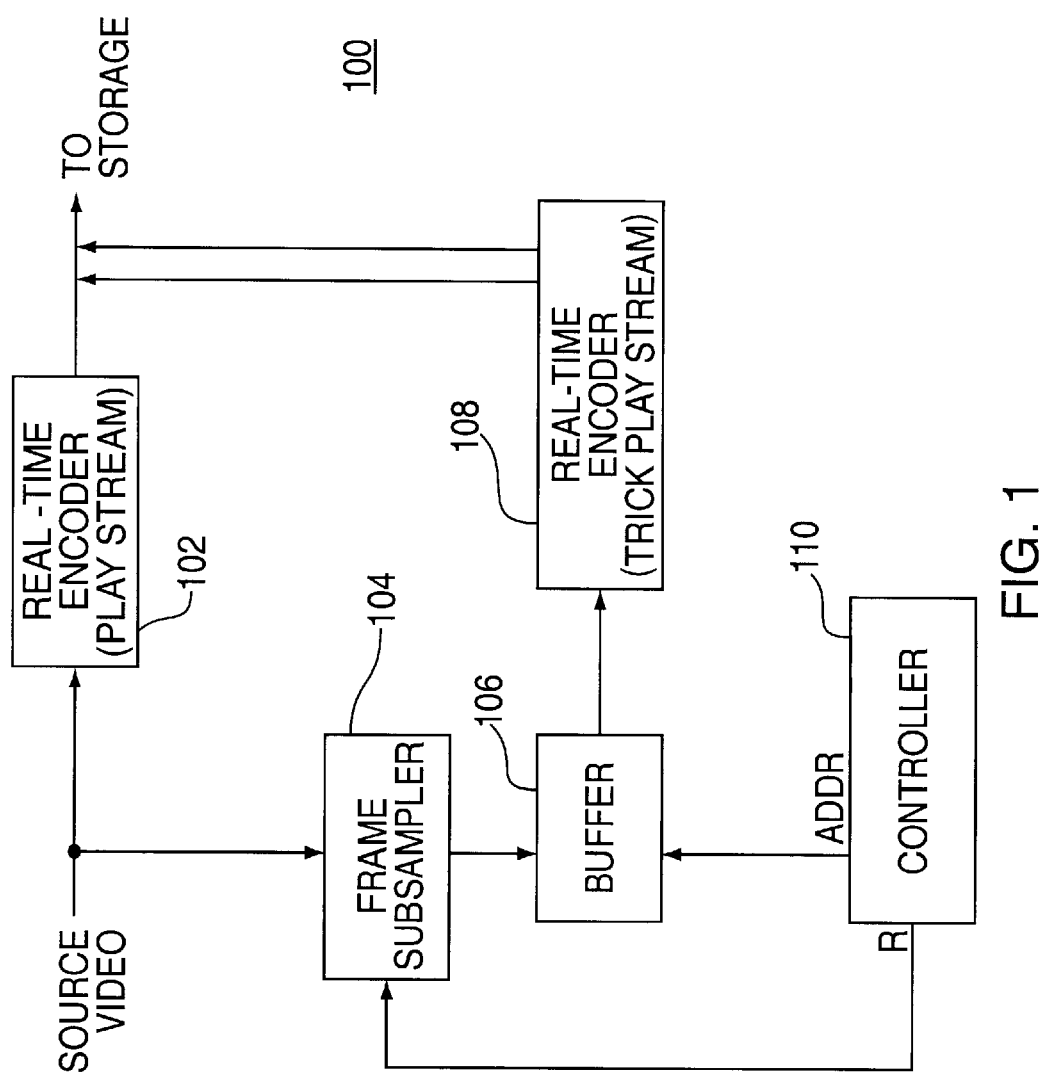
FIG. 1 depicts a block diagram of the all-in-one encoder of the present invention.

FIG. 1 depicts a block diagram of an all-in-one encoder 100 comprising a first encoder 102, frame subsampler 104, a frame buffer 106, a second encoder 108 and a controller 110. The first encoder 102 encodes a source video sequence in a conventional manner, i.e., compressing the source video sequence in real-time as the frames are input to the encoder. The second encoder 108 operating in conjunction with the subsampler 104 and the buffer 106 encodes a subsampled version of the source video sequence to form a fast forward and fast reverse bitstreams (collectively referred to herein as trick play bitstreams or trick play streams). The first encoder (the play stream encoder 102) contains a real-time MPEG-2 encoder that produces an MPEG-2 compliant, compressed video bitstream (a play stream) from a sequence of 601-format video frames. The second encoder (the trick play stream encoder 108) is also an MPEG-2 real-time encoder.

For the following discussion, frame numbering is used to describe the temporal order in which frames occur in source material where 1 is the first frame in the source material frame sequence and 2 is the second frame and so on. For the following description, R is an integer and defines a playback speed multiplier which has significance in the trick play processes. The speed multiplier R is a variable that is established by the controller 110. The controller 110 is a microprocessor or microcontroller as well as support circuits such as memory, clocks, power supplies, etc. that is programmed to perform the control functions of the all in one encoder 100.

Throughout this disclosure, the exemplary trick play streams are fast forward and fast reverse. Of course other forms of trick play streams may be generated using the all-in-one encoder 100 of the present invention. If the multiplier R equals 2, playback (decoding) of a fast forward stream is twice normal single speed. If R equals 3, playback is three times normal play speed and so on. Generally, the trick play streams include a nine times fast forward stream and a nine times fast reverse stream. Alternatively, 32 times normal fast forward and fast reverse streams are also available. The term source or source video is used to describe the uncompressed video material such as 601-format video from which the trick play bitstreams are generated.

Using the all-in-one encoder 100, a fast forward MPEG video bitstream is generated from an uncompressed video source such that when the stream is played back linearly through a standard MPEG compliant video decoder, the resulting imagery contains every Rth frame of the original video sequence. As such, the display of the sequence has a fast forward effect.

A fast reverse stream is simultaneously produced by the all-in-one encoder such that when linearly played back through a an MPEG compliant video decoder, the decoded stream produces a sequence of frames that play in reverse relative to the original frame sequence.

The play bitstream is formed using a conventional MPEG-compliant encoder 102 that compresses a plurality of frames (N frames that form a group-of-pictures (GOP)). As is known in the art, an N-frame GOP comprises at least one (e.g., one) intra-coded frame (i.e., an I-frame) and at least one (e.g., N−1) inter-coded frames (i.e., forward predicted P-frames and/or bi-directionally predicted B-frames). To form the trick play streams having N frame GOPs, the subsampler 104 extracts one out of every R consecutive frames (arranged in increasing time code order) from the source sequence. The selected N frames are buffered in the frame buffer 106. For example, if R is two and the buffer stores N frames, the buffer stores frames 1, 3, 5, 7, 9, and so on up to frame 2N+1. The buffer 106 stores N successive frames that define a GOP for the trick play bitstreams. As such, where multiple frames (i.e., every Rth frame) are selected, the selected frames include frames to be intra-coded and frames to be inter-coded. Since the selected frames to be interceded often represent a moving image, such inter-coded frames have associate with them non-zero motion vectors.

Figure 2:
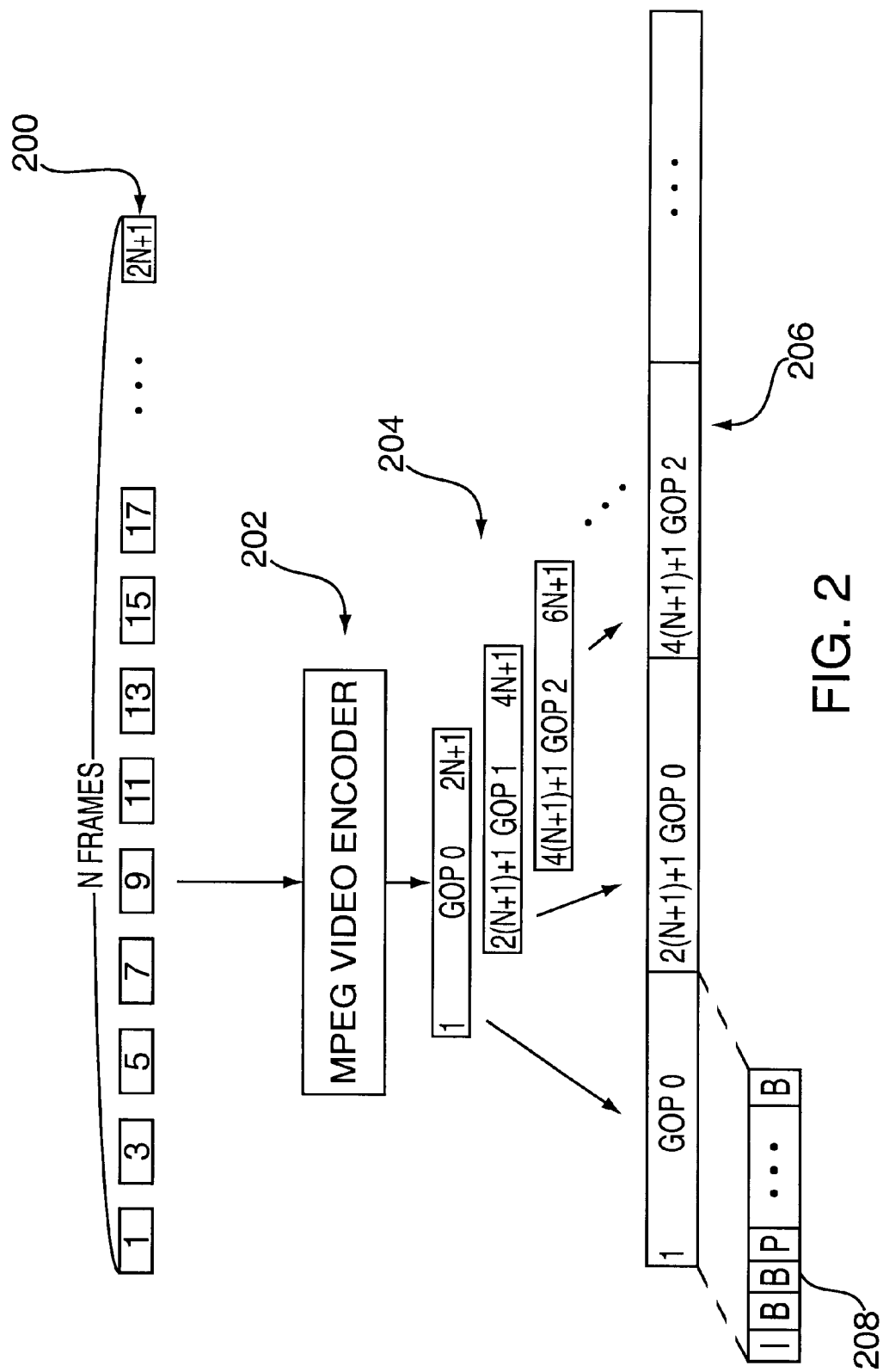
FIG. 2 illustrates the method of the present invention used to produce a fast forward bitstream.

FIG. 2 illustrates the process by which a fast forward stream is produced. Sequence 200 represents the RN frames (frames 1 to RN+1) that have been subsampled from a video frame sequence at a one of R rate from a video frame sequence and stored in the buffer (e.g., R=2, then 2N frames are subsampled to form a trick play GOP). These buffered frames are recalled from memory and encoded and then associated with a normal play stream having a GOP of N frames. The encoder (at step 202) repetitively produces a sequence of GOPs 204 that are stored in increasing addresses in memory as illustrated in sequence 206. The first GOP (GOP 0) contains frames 1 to RN+1, the second GOP (GOP 1) contains frames R(N+1)+1 through 2RN+1, the third GOP (GOP 2) contains frames 2R(N+1)+1 through 3RN+1, and so on, wherein each GOP is formed by at least one I-frame, and one or more P-frames and/or B-frames 208. To generalize, a GOP contains frames GR(N+1)+1 through (G+1)RN+1, where G is the GOP number (e.g., 0, 1, 2, 3, . . . ), R is the subsampling rate, and N is the number of frames in a standard play GOP.

Figure 3:
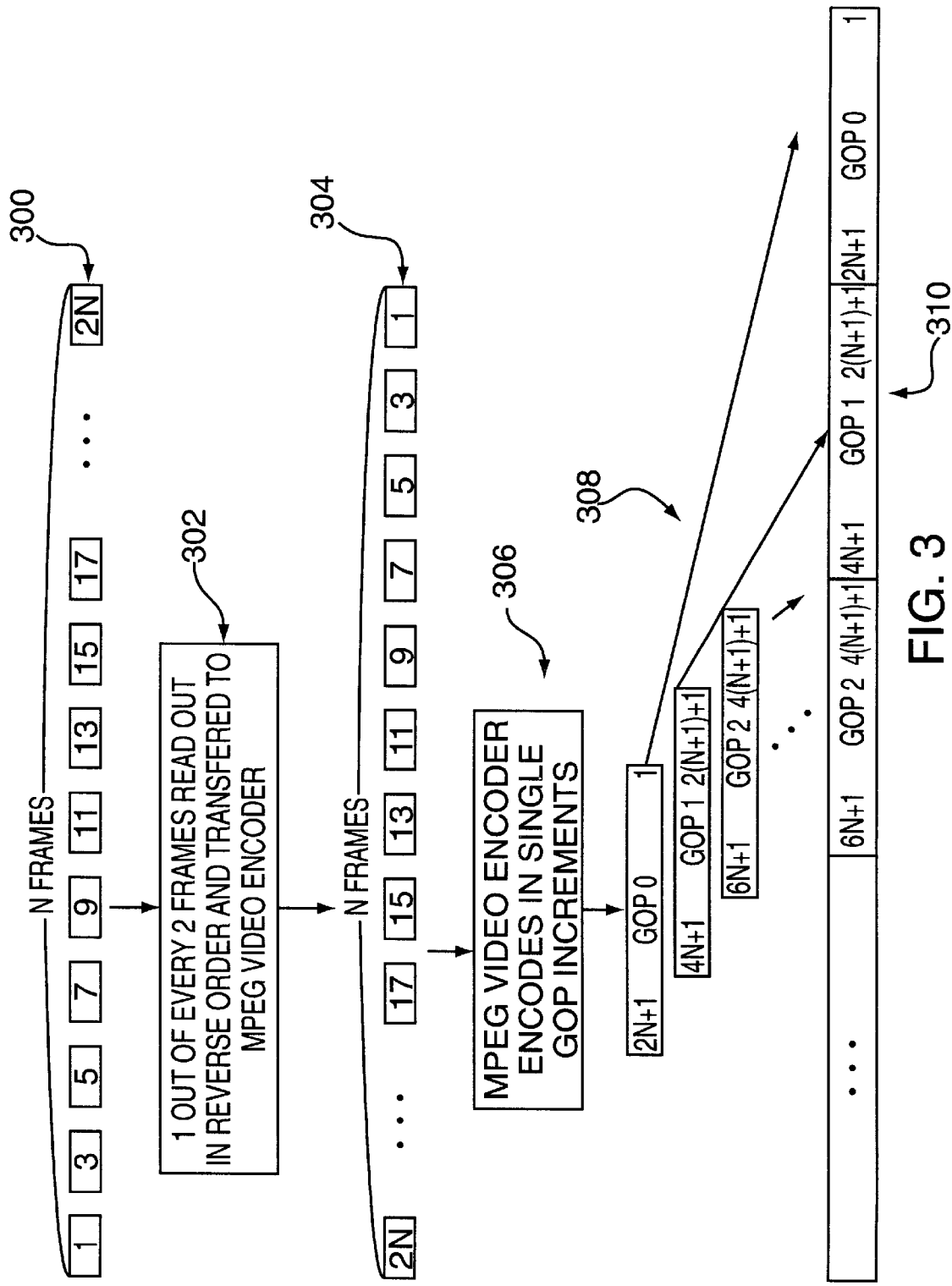
FIG. 3 illustrates the method of the present invention used to produce a fast reverse bitstream.

FIG. 3 illustrates the process by which a fast reverse stream is produced. Sequence 300 represents the RN frames that have been buffered after subsampling at one of R rate (e.g., R=2 in FIG. 3). At step 302, these frames are selected from the buffer in reverse order as illustrated at 304. The reverse order frames are encoded, at step 306, to produce a sequence of GOPs 308 that are stored in reverse time order in memory as illustrated in sequence 310.

Although various embodiments which incorporate the teachings of the present invention have been shown and described in detail herein, those skilled in the art can readily devise many other varied embodiments that still incorporate these teachings.

What is claimed is:

1. Apparatus for producing a plurality of encoded video bitstreams from a video sequence comprising:

a first encoder for producing a first bitstream that contains information that, when decoded, produces a standard forward play video frame sequence;

a frame subsampler;

a buffer that stores subsampled frames of the video sequence;

a second encoder for producing a second bitstream that contains information that, when decoded, produces a first trick play frame sequence;

a third encoder for producing a third bitstream that contains information that, when decoded, produces a second trick play video frame sequence; and a controller that selects subsampled frames from the buffer and couples the selected frames to the second and third encoders, wherein at least one of said second and third bitstreams comprises both intra-coded and inter-coded video frames, including inter-coded video frames having non-zero motion vectors.

2. The apparatus of claim 1 wherein said first encoder is an MPEG encoder that encodes N frames of the video sequence.

3. The apparatus of claim 1 wherein said second and third encoders are MPEG encoders that encodes R/N frames of the video sequence having N frames.

4. The apparatus of claim 1 wherein said first trick play video frame sequence is a fast forward video frame sequence.

5. The apparatus of claim 1 wherein said second trick play video frame sequence is a fast reverse video frame sequence.

6. The apparatus of claim 1 wherein the controller multiplexes selection of the frames from the buffer to apply a plurality of subsampled frames to said second encoder to form said second bitstream and then apply a plurality of subsampled frames to said third encoder to form said third bitstream.

7. A method of encoding frames of a video sequence to form a plurality of bitstreams comprising the steps of:

encoding said frames to form a first bitstream;

subsampling said frames;

buffering said subsampled frames;

recalling said buffered frames in a forward time sequence order;

encoding said recalled buffered frames to form a second bitstream;

recalling said buffered frames in a reverse time sequence order; and encoding said recalled buffered frames to form a third bitstream, wherein at least one of said second and third bitstreams comprises both intra-coded and inter-coded video frames, including inter-coded video frames having non-zero motion vectors.

8. The method of claim 7 wherein said first bitstream when decoded forms a standard play frame sequence.

9. The method of claim 7 wherein said second bistream, when decoded, forms a fast forward frame sequence.

10. The method of claim 7 wherein said third bitstream, when decoded, forms a fast reverse frame sequence.

11. A method of encoding frames of a video sequence to form a plurality of bitstreams comprising the steps of:

encoding said frames to form a first bitstream;

while encoding said frames to form said first bitstream, selecting a subsampled set of frames from said frames of said video sequence; and encoding the subsampled set of frames to form a second bitstream comprising both intra-coded and inter-coded video frames, including inter-coded video frames having non-zero motion vectors.

12. The method of claim 11 further comprising the steps of:

buffering said subsampled set of frames;

recalling said buffered frames in a forward time sequence order; and encoding said recalled buffered frames to form said second bitstream.

13. The method of claim 12 wherein said second bitstream, when decoded, forms a fast forward video frame sequence.

14. The method of claim 11 further comprising the steps of:

buffering said subsampled set of frames;

recalling said buffered frames in a reverse time sequence order; and encoding said recalled buffered frames to form said second bitstream.

15. The method of claim 14 wherein said second bitstream, when decoded, forms a fast reverse video frame sequence.

16. The method of claim 11 further comprising the steps of:

buffering said subsampled frames of said frames in said video sequence;

recalling said buffered frames in a forward time sequence order;

encoding said recalled buffered frames to form a second bitstream;

recalling said buffered frames in a reverse time sequence order;

encoding said recalled buffered frames to form a third bitstream.

17. The method of claim 16 wherein said first bitstream when decoded forms a standard play frame sequence.

18. The method of claim 16 wherein said second bistream, when decoded, forms a fast forward frame sequence.

19. The method of claim 16 wherein said third bitstream, when decoded, forms a fast reverse frame sequence.

* * * * *

UNITED STATES PATENT AND TRADEMARK OFFICE
CERTIFICATE OF CORRECTION

PATENT NO. : 6,389,218 B2
DATED : May 14, 2002
INVENTOR(S) : Gordon et al.

It is certified that error appears in the above-identified patent and that said Letters Patent is hereby corrected as shown below:

Column 3,
Line 42, delete "interceded" and insert instead -- inter-coded --.

Signed and Sealed this

Fifteenth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,389,218 B2  
DATED         : May 14, 2002  
INVENTOR(S)   : Gordon et al.

It is certified that error appears in the above-identified patent and that said Letters Patent is hereby corrected as shown below:

Column 3,
Line 42, delete "interceded" and insert instead -- inter-coded --.

Signed and Sealed this

Eighteenth Day of November, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,389,218 B2  Page 1 of 1
DATED : May 14, 2002
INVENTOR(S) : Gordon et al.

It is certified that error appears in the above-identified patent and that said Letters Patent is hereby corrected as shown below:

<u>Column 3,</u>
Line 42, delete "interceded" and insert instead -- inter-coded --.
Between lines 43 and 44, insert:

--To produce a fast forward stream, the N frames from the buffer 106 are recalled under the control of the controller 110 and coupled sequentially into the real-time encoder 108. The real-time encoders 102 and 108 used herein may be any form of encoder that compresses video information. One illustrative MPEG encoder is the E4 chip set available from C-Cubed of Springfield, Virginia. The output is a compressed bitstream representing a fast forward GOP.

To produce a fast reverse stream, the N frames from the buffer 106 are recalled under the control of the controller 110 and are coupled in reverse time order into the encoder 108. Although two encoders could be used to produce each of the trick play streams independently, as long as R equals two or more, a single encoder can be used to produce both trick play tracks using time multiplexing technique. To perform the multiplexed encoding, the fast forward GOP is encoded first, then the fast reverse GOP. After the buffer is filled with another N frames, the GOP pair is again encoded and so on. The recall order of the frames from the buffer and the multiplexing process are controlled by controller 110 by addressing the buffer in forward order for the fast forward GOP and in reverse order for the fast reverse GOP.

The forward and reverse GOPs contain sequence start and sequence end codes such that, when stored in a mass storage device, the bitstreams are clearly delimited.

The forward and reverse GOP bitstreams are stored with the play stream in a storage medium such as a disk drive array or magneto-optical disk. The fast forward stream is written sequentially, one GOP bitstream at a time, from the lowest address to the highest address. The reverse bitstream is stored in reverse order from highest address to lowest address. The last byte in the reverse GOP is placed in the highest address space of the reverse target file. As such, the reverse GOP precedes, in address space, the first frame of the immediately previously written reverse GOP.

The entire source material frame sequence is encoded in this manner to simultaneously produce a play, a fast forward, and fast reverse streams in real-time.--

Signed and Sealed this

Second Day of December, 2003

JAMES E. ROGAN
*Director of the United States Patent and Trademark Office*